United States Patent
Nakatani et al.

(10) Patent No.: US 12,212,939 B2
(45) Date of Patent: Jan. 28, 2025

(54) TARGET SOUND SIGNAL GENERATION APPARATUS, TARGET SOUND SIGNAL GENERATION METHOD, AND PROGRAM

(71) Applicant: NIPPON TELEGRAPH AND TELEPHONE CORPORATION, Tokyo (JP)

(72) Inventors: Tomohiro Nakatani, Tokyo (JP); Keisuke Kinoshita, Tokyo (JP); Marc Delcroix, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 217 days.

(21) Appl. No.: 18/010,790

(22) PCT Filed: Jun. 19, 2020

(86) PCT No.: PCT/JP2020/024175
§ 371 (c)(1),
(2) Date: Dec. 15, 2022

(87) PCT Pub. No.: WO2021/255925
PCT Pub. Date: Dec. 23, 2021

(65) Prior Publication Data
US 2023/0239616 A1    Jul. 27, 2023

(51) Int. Cl.
*H04R 3/00* (2006.01)
*G06N 3/084* (2023.01)
(Continued)

(52) U.S. Cl.
CPC .............. *H04R 3/005* (2013.01); *G06N 3/084* (2013.01); *G10K 11/1752* (2020.05); *G10K 11/34* (2013.01); *H04R 1/406* (2013.01)

(58) Field of Classification Search
CPC .... H04R 3/005; H04R 1/406; G10K 11/1752; G10K 11/34; G06N 3/084
(Continued)

(56) References Cited

U.S. PATENT DOCUMENTS

| 2018/0040333 A1* | 2/2018 | Wung ................. G10L 21/0232 |
| 2019/0043491 A1* | 2/2019 | Kupryjanow ....... G10L 21/0208 |

(Continued)

OTHER PUBLICATIONS

Heymann et al. (2016) "Neural Network Based Spectral Maskestimation for Acoustic Beamforming" ICASSP2016, Mar. 20, 2016.
(Continued)

*Primary Examiner* — Vivian C Chin
*Assistant Examiner* — Douglas J Suthers (57) ABSTRACT

Provided is a target sound extraction technique based on a steering vector generation method enabling instability in a calculation to be prevented when a neural network is trained by using an error back propagation method to reduce an estimation error of a beamformer. A target sound signal generation apparatus generates a target sound signal $y_{t,f}$ corresponding to a target sound included in an observed sound from an observed signal vector $x_{t,f}$ corresponding to the observed sound collected by using a plurality of microphones. The target sound signal generation apparatus includes a mask generation unit, a steering vector generation unit, a beamformer vector generation unit, and a target sound signal generation unit. The mask generation unit is configured as a neural network trained by using an error back propagation method. The steering vector generation unit generates a steering vector $h_f$ by determining an eigenvector corresponding to a maximum eigenvalue of a predetermined matrix generated from the observed signal vector $x_{t,f}$ and a mask $\gamma_{t,f}$ by using a power method.

12 Claims, 9 Drawing Sheets

(51) Int. Cl.
  *G10K 11/175* (2006.01)
  *G10K 11/34* (2006.01)
  *H04R 1/40* (2006.01)

(58) Field of Classification Search
  USPC ........................................................ 381/73.1
  See application file for complete search history.

(56) References Cited

U.S. PATENT DOCUMENTS

2019/0139563 A1* 5/2019 Chen ..................... G06N 3/044
2020/0143819 A1* 5/2020 Delcroix ............. G10L 21/0272
2020/0322722 A1* 10/2020 Chen ..................... H04R 3/005

OTHER PUBLICATIONS

Ochiai et al. (2017) "Unified Architecture for Multichannel End-to-End Speech Recognition with Neural Beamforming" EEE Journal of Selected Topics in Signal Processing, vol. 11, No. 8, pp. 1274-1288.

* cited by examiner

TARGET SOUND SIGNAL GENERATION APPARATUS, TARGET SOUND SIGNAL GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/024175, filed on 19 Jun. 2020, the disclosure of which is hereby incorporated herein by reference in its entirety.

TECHNICAL FIELD

The present disclosure relates to a technique for extracting a target sound included in an observed sound collected by using a plurality of microphones.

BACKGROUND ART

A beamformer (BF) is known as a signal processing technique for extracting a target sound included in an observed sound collected by using a plurality of microphones. Examples of such a technique for estimating the beamformer include the techniques disclosed in NPL 1 and NPL 2.

In the technique of NPL 1, a steering vector is determined to estimate the beamformer. Thus, in the technique of NPL 1, it is necessary to determine an eigenvector corresponding to a maximum eigenvalue of a predetermined matrix generated by using a mask obtained by a neural network. That is, in the technique of NPL 1, it is necessary to solve an eigenvalue decomposition problem.

On the other hand, in the technique of NPL 2, it is not necessary to determine the steering vector to estimate the beamformer. The technique of NPL 2 enables the beamformer to be estimated simply by performing an inverse matrix operation of a matrix instead of solving the eigenvalue decomposition problem.

CITATION LIST

Non Patent Literature

NPL 1: J. Haymann, L. Drude, R. Haeb-Umbach, "Neural network based spectral mask estimation for acoustic beamforming," 2016 IEEE International Conference on Acoustics, Speech and Signal Processing (ICASSP), 2016.

NPL 2: T. Ochiai, S. Watanabe, T. Hori, J. R. Hershey, X. Xiao, "Unified Architecture for Multichannel End-to-End Speech Recognition with Neural Beamforming," IEEE Journal of Selected Topics in Signal Processing, vol. 11, no. 8, pp. 1274-1288, 2017.

SUMMARY OF THE INVENTION

Technical Problem

The technique of NPL 1 can cause a numerically unstable calculation of the error back propagation in a portion corresponding to the eigenvalue decomposition problem in trying to train a neural network by using an error back propagation method to reduce an estimation error of a beamformer, failing to reduce the estimation error of the beamformer. On the other hand, the technique of NPL 2 has a large approximation error in the calculation for estimating the beamformer, deteriorating estimation accuracy of the beamformer in an environment in which a level of noise and reverberation is high.

In response to the issues, an object of the present disclosure is to provide a target sound extraction technique based on a steering vector generation method enabling instability in a calculation to be prevented when a neural network is trained by using an error back propagation method to reduce an estimation error of a beamformer.

Means for Solving the Problem

One aspect of the present disclosure is a target sound signal generation apparatus including a mask generation unit that generates a mask $\gamma_{t,f}$ from an observed signal vector $x_{t,f}$ corresponding to an observed sound collected by using a plurality of microphones, a steering vector generation unit that generates a steering vector $h_f$ from the observed signal vector $x_{t,f}$ and the mask $\gamma_{t,f}$, a beamformer vector generation unit that generates a beamformer vector $w_f$ from the observed signal vector $x_{t,f}$ and the steering vector $h_f$, and a target sound signal generation unit that generates a target sound signal $y_{t,f}$ corresponding to a target sound included in the observed sound from the observed signal vector $x_{t,f}$ and the beamformer vector $w_f$, where t is an index representing a time frame, and f is an index representing a frequency bin. The mask generation unit is configured as a neural network trained by using an error back propagation method, and the steering vector generation unit generates the steering vector $h_f$ by determining an eigenvector corresponding to a maximum eigenvalue of a predetermined matrix generated from the observed signal vector $x_{t,f}$ and the mask $\gamma_{t,f}$ by using a power method.

One aspect of the present disclosure is a target sound signal generation apparatus including a mask generation unit that generates a mask $\gamma_{t,f}$ from an observed signal vector $x_{t,f}$ corresponding to an observed sound collected by using a plurality of microphones, an intermediate signal vector generation unit that generates an intermediate signal vector $\hat{x}_{t,f}$, which is a predetermined vector obtained by using the observed signal vector $x_{t,f}$, a steering vector generation unit that generates a steering vector $h_f$ from the intermediate signal vector $\hat{x}_{t,f}$ and the mask $\gamma_{t,f}$, a beamformer vector generation unit that generates a beamformer vector $w_f$ from the intermediate signal vector $\hat{x}_{t,f}$ and the steering vector $h_f$, and a target sound signal generation unit that generates a target sound signal $y_{t,f}$ corresponding to a target sound included in the observed sound from the intermediate signal vector $\hat{x}_{t,f}$ and the beamformer vector $w_f$, where t is an index representing a time frame, and f is an index representing a frequency bin. The mask generation unit is configured as a neural network trained by using an error back propagation method, and the steering vector generation unit generates the steering vector $h_f$ by determining an eigenvector corresponding to a maximum eigenvalue of a predetermined matrix generated from the observed signal vector $x_{t,f}$ and the mask $\gamma_{t,f}$ by using a power method.

Effects of the Invention

The present disclosure allows for preventing instability in a calculation when a neural network is trained by using an error back propagation method to reduce an estimation error of a beamformer.

DESCRIPTION OF EMBODIMENTS

Hereinafter, embodiments of the present disclosure will be described in detail. Components having the same function are given the same numeral, and duplicated description will be omitted.

Prior to describing each embodiment, the method of notation herein will be described.

A caret (^) represents a superscript. For example, $x^{y^z}$ indicates that $y^z$ is the superscript of x, and $x_{y^z}$ indicates that $y^z$ is the subscript of x. An underscore (_) represents a subscript. For example, $x^{y\_z}$ indicates that $y_z$ is the superscript of x, and $x_{y\_z}$ indicates that $y_z$ is the subscript of x.

Superscripts of a certain character x such as "^" in ^x and "~" in ~x should normally be written directly above "x", but ^x and ~x are used due to limitations of the description notation herein.

Furthermore, a complex conjugate transpose of a matrix M or a vector v is represented by a superscript $^H$, such as in $v^H$ or $M^H$. An inverse matrix of the matrix M is represented by a superscript$^{-1}$, such as in $M^{-1}$. A complex conjugate of a scalar s is represented by a superscript *, such as in s*.

Technical Background

In an embodiment of the present disclosure, a steering vector is generated by approximately determining an eigenvector corresponding to a maximum eigenvalue, by using only a matrix operation. This eliminates the need for solving an eigenvalue decomposition problem, enabling instability in the calculation to be prevented in training a neural network by using an error back propagation method to further reduce an estimation error of a beamformer.

The present method includes a predetermined iterative calculation. If the number of repetitions increases, it is possible to suppress an error of the approximation calculation for determining an eigenvector corresponding to the maximum eigenvalue and improve the estimation accuracy of the beamformer.

A signal is hereinafter regarded as a value in a time frequency domain after the signal is applied with a short-time Fourier transform (STFT). t denotes an index representing a time frame, and f denotes an index representing a frequency bin.

First Embodiment

A target sound signal generation apparatus 100 generates, from an observed signal vector $x_{t,f}$ corresponding to an observed sound collected by using a plurality of microphones, a target sound signal $y_{t,f}$ corresponding to a target sound included in the observed sound.

Figure 1:
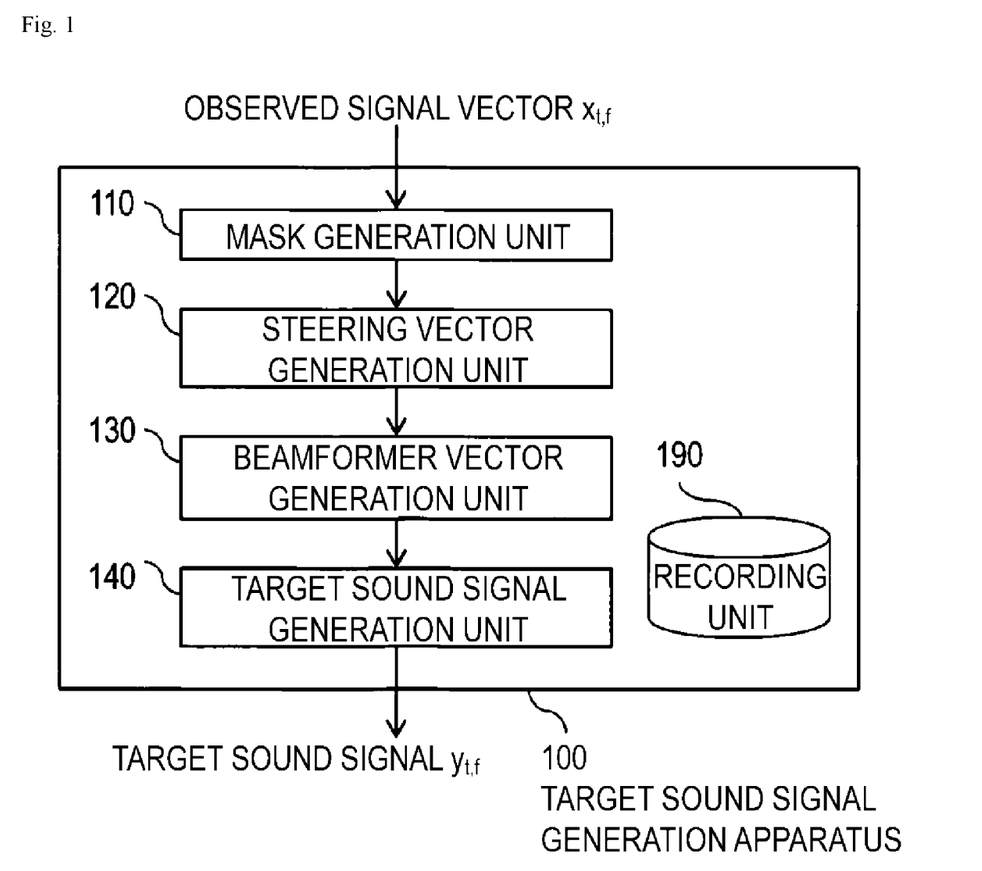
FIG. 1 is a block diagram illustrating a configuration of a target sound signal generation apparatus 100.
Figure 2:
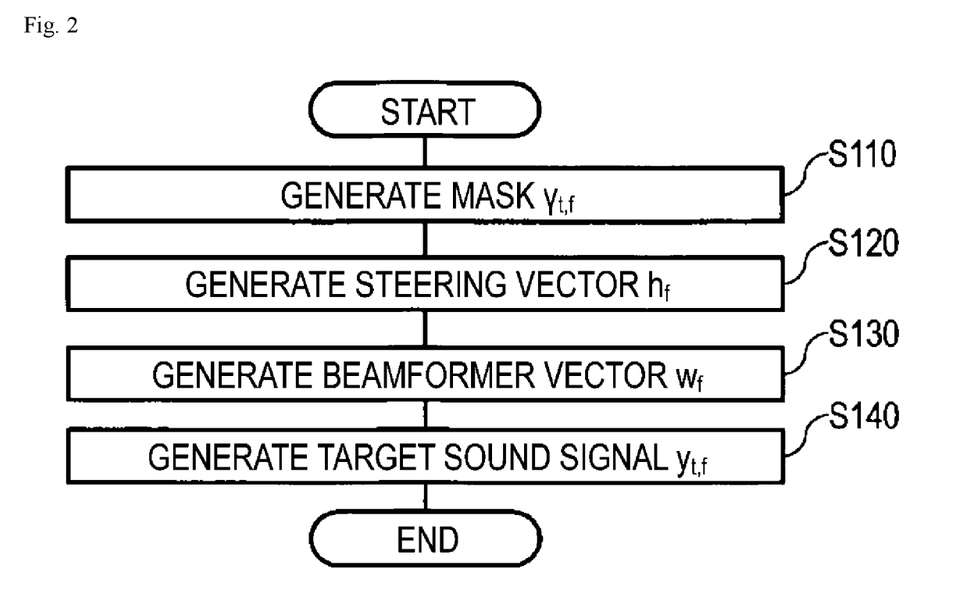
FIG. 2 is a flowchart illustrating an operation of the target sound signal generation apparatus 100.

The target sound signal generation apparatus 100 will be described below with reference to FIGS. 1 and 2. FIG. 1 is a block diagram illustrating a configuration of the target sound signal generation apparatus 100. FIG. 2 is a flowchart illustrating an operation of the target sound signal generation apparatus 100. As illustrated in FIG. 1, the target sound signal generation apparatus 100 includes a mask generation unit 110, a steering vector generation unit 120, a beamformer vector generation unit 130, a target sound signal generation unit 140, and a recording unit 190. The recording unit 190 is a constituent component configured to appropriately record information required for processing of the target sound signal generation apparatus 100.

The operation of the target sound signal generation apparatus 100 will be described with reference to FIG. 2.

In S110, the mask generation unit 110 receives the observed signal vector $x_{t,f}$ as an input to generate and output a mask $\gamma_{t,f}$ from the observed signal vector $x_{t,f}$. Here, the mask is used to calculate a spatial covariance matrix described later. Specifically, the mask is an index having a value from 0 to 1. For example, the mask $\gamma_{t,f}$ may indicate a probability that a target sound signal is included in each time frame t and each frequency bin f. In this case, $\gamma_{t,f}=1$ indicates that the target sound signal is included, and $\gamma_{t,f}=0$ indicates that the target sound signal is not included. Furthermore, $\gamma_{t,f}$ having a value between 0 and 1 indicates an intermediate state between a state where the target sound signal is included and a state where the target sound signal is not included. Moreover, the mask $\gamma_{t,f}$ may indicate a probability that a target sound is included in each time frame t. In this case, the mask $\gamma_{t,f}$ has the same value at any frequency.

Furthermore, the mask generation unit 110 may be configured by using a neural network described in NPL 1 and NPL 2. That is, the mask generation unit 110 is configured as a neural network trained by using an error back propagation method.

In S120, the steering vector generation unit 120 receives the observed signal vector $x_{t,f}$ and the mask $\gamma_{t,f}$ generated in S110 as an input to generate and output a steering vector $h_f$ from the observed signal vector $x_{t,f}$ and the mask $\gamma_{t,f}$. Here, the steering vector is used to calculate a beamformer vector described later.

Figure 3:
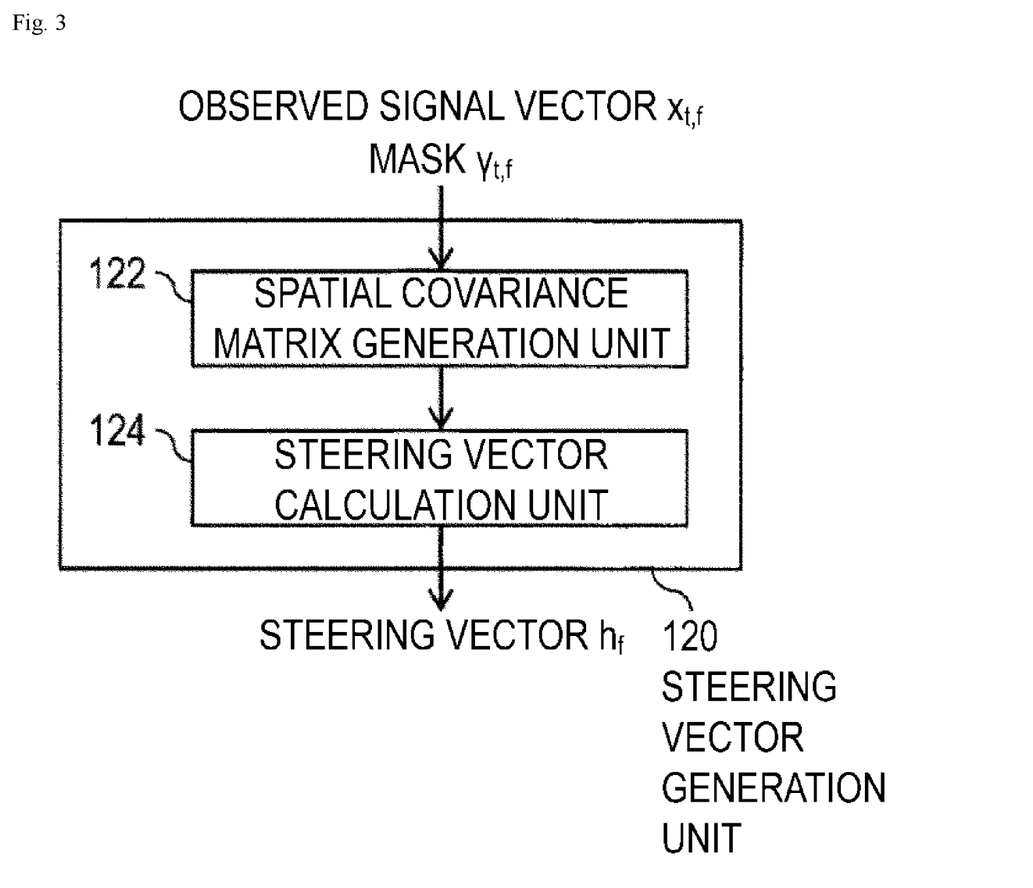
FIG. 3 is a block diagram illustrating a configuration of a steering vector generation unit 120.
Figure 4:
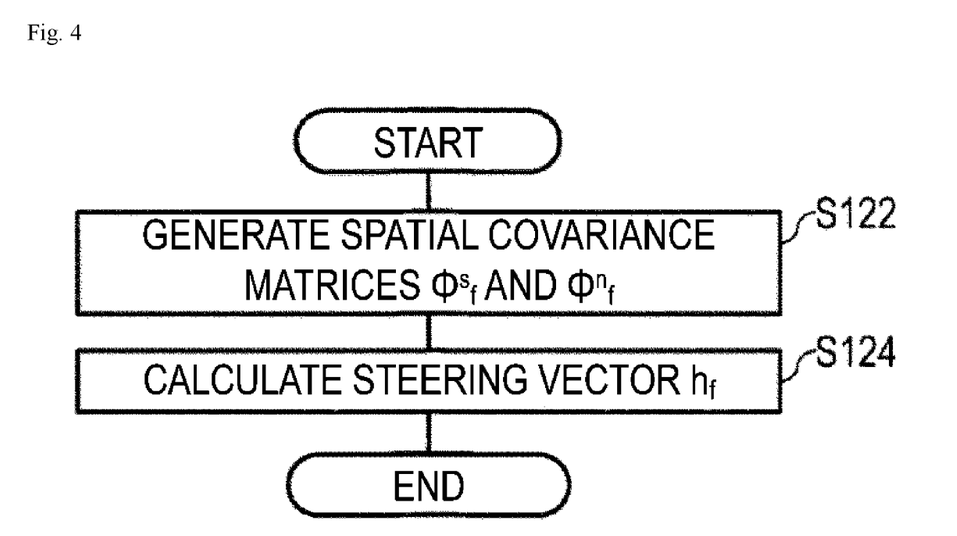
FIG. 4 is a flowchart illustrating an operation of the steering vector generation unit 120.

The steering vector generation unit 120 may be configured to generate the steering vector $h_f$ by determining an eigenvector corresponding to a maximum eigenvalue of a predetermined matrix generated from the observed signal vector $x_{t,f}$ and the mask $\gamma_{t,f}$ by using a power method. The steering vector generation unit 120 will be described below with reference to FIGS. 3 and 4. FIG. 3 is a block diagram illustrating a configuration of the steering vector generation unit 120. FIG. 4 is a flowchart illustrating an operation of the steering vector generation unit 120. As illustrated in FIG. 3, the steering vector generation unit 120 includes a spatial covariance matrix generation unit 122 and a steering vector calculation unit 124.

An operation of the steering vector generation unit 120 will be described with reference to FIG. 4.

In S122, the spatial covariance matrix generation unit 122 receives the observed signal vector $x_{t,f}$ and the mask $\gamma_{t,f}$ generated in S110 as an input to generate and output a target sound spatial covariance matrix $\Phi^s_f$ and a noise spatial covariance matrix $\Phi^n_f$ from the observed signal vector $x_{t,f}$ and the mask $\gamma_{t,f}$. The spatial covariance matrix generation unit 122 generates, according to the following equations, the target sound spatial covariance matrix $\Phi^s_f$ and the noise spatial covariance matrix $\Phi^n_f$.

$$\Phi^s_f = \frac{\sum_t \gamma_{t,f} x_{t,f} x_{t,f}^H}{\sum_t \gamma_{t,f}} \quad \text{[Math. 1]}$$

$$\Phi^n_f = \frac{\sum_t (1-\gamma_{t,f}) x_{t,f} x_{t,f}^H}{\sum_t (1-\gamma_{t,f})}$$

In S124, the steering vector calculation unit 124 receives the target sound spatial covariance matrix $\Phi^s_f$ and the noise spatial covariance matrix $\Phi^n_f$ generated in S122 as an input, and uses the target sound spatial covariance matrix $\Phi^s_f$ and the noise spatial covariance matrix $\Phi^n_f$ to calculate and output the steering vector $h_f$ from an initial vector u. Here, the initial vector u may be any vector, and may be, for example, a vector in which an element corresponding to a reference microphone r is 1 and an element corresponding to another microphone is 0. The steering vector calculation unit 124 calculates the steering vector $h_f$ according to the following equation

[Math. 2]

$$h_f = \Phi^n_f((\Phi^n_f)^{-1}\Phi^s_f)^m u \quad (1)$$

where m is an integer of 1 or greater representing the number of repetitions. $((\Phi^n_f)^{-1}\Phi^s_f)^m u$ in Equation (1) corresponds to approximately calculating, by using the power method, an eigenvector corresponding to a maximum eigenvalue of the matrix $(\Phi^n_f)^{-1}\Phi^s_f$. It is known that an eigenvector corresponding to the maximum eigenvalue can be accurately obtained for any initial vector u by selecting a sufficiently great positive integer for m representing the number of repetitions. It is also known that, even when m is a relatively small value, for example, m=1, the eigenvector mentioned above can be approximated with a certain accuracy. Consequently, instead of solving the eigenvalue decomposition problem, the steering vector can be estimated with a high accuracy from the calculation of Equation (1).

In S130, the beamformer vector generation unit 130 receives the observed signal vector $x_{t,f}$ and the steering vector $h_f$ generated in S120 as an input to generate and output a beamformer vector $w_f$ from the observed signal vector $x_{t,f}$ and the steering vector $h_f$. The beamformer vector generation unit 130 generates the beamformer vector $w_f$ according to the following equation $$w_f = \frac{R_f^{-1} h_f}{h_f^H R_f^{-1} h_f} h_{f,r}^* \quad \text{[Math. 3]}$$

where $h_{f,r}$ is an element of the steering vector $h_f$ corresponding to the reference microphone r. Furthermore, a matrix $R_f$ is calculated according to the following equation $$R_f = \Sigma_t x_{t,f} x_{t,f}^H \quad \text{[Math. 4]}$$

where the sum mentioned above is a sum for the time frame t included in a noise section.

In S140, the target sound signal generation unit 140 receives the observed signal vector $x_{t,f}$ and the beamformer vector $w_f$ generated in S130 as an input to generate and output the target sound signal $y_{t,f}$ from the observed signal vector $x_{t,f}$ and the beamformer vector $w_f$. The target sound signal generation unit 140 generates the target sound signal $y_{t,f}$ according to the following equation.

$$y_{t,f} = w_f^H x_{t,f} \quad \text{[Math. 5]}$$

As described above, in the present embodiment, the output (that is, the target sound signal) of a beamformer is determined depending on a mask estimated by using a neural network. Consequently, if the accuracy in the estimation of the mask by the neural network can be improved, further improvement in the accuracy of the output of the beamformer can also be expected. NPL 2 discloses the use of an error back propagation method, for example, as a method for achieving this improvement. In NPL 2, a gradient of weights for updating a neural network is determined so that a cost function E ({$y_{t,f}$}) for measuring an estimation accuracy of all pieces of output {$y_{t,f}$} of a beamformer is minimized. Here, {·} collectively represents a set of symbols (for example, y) having different values of subscripts. In general, the error back propagation method can be employed when processing from the input to the output is configured as a connection of processing blocks having differentiable input/output relationships. In the case of the beamformer processing according to the present embodiment, processing blocks including the estimation of the mask by the neural network, the estimation of the beamformer based on the mask, and the application of the beamformer can each be expressed as a differentiable function, as described below.

The estimation of the mask by the neural network can be expressed as a differentiable function M where an observed signal vector {$x_{t,f}$} and a weighting factor {$\theta_i$} (where $\theta_i$ represents a weighting factor of an i-th neural network) are received as an input to output a mask {$\gamma_{t,f}$}.

$$\gamma_{t,f} = M(\{x_{t,f}\}, \{\theta_i\}) \quad \text{[Math. 6]}$$

Similarly, the estimation of the beamformer based on the mask can be expressed as a differentiable function W where the mask {$\gamma_{t,f}$} and the observed signal vector {$x_{t,f}$} are received as an input to output a beamformer vector {$w_f$}.

$$w_f = W(\{\gamma_{t,f}\}, \{x_{t,f}\}) \quad \text{[Math. 7]}$$

Similarly, the application of the beamformer can be expressed as a differentiable function G where the beamformer vector $w_f$ and the observed signal vector $x_{t,f}$ are received as an input to output the target sound signal $y_{t,f}$.

$$y_{t,f} = G(w_f, x_{t,f}) \quad \text{[Math. 8]}$$

In the error back propagation method, training of a neural network is achieved by transmitting information required for calculating a gradient $\partial E/\partial \theta_i$ of weighting factors of the neural network, in a reverse order of the procedure of the estimation of the beamformer, that is, in the direction from the output to the input. In recent years, it is possible to easily perform calculations in the error back propagation method by using software provided for training neural networks (for example, PyTorch or TensorFlow). Unfortunately, including a portion for solving the eigenvalue decomposition problem in the above-described processing blocks causes the calculations in the error back propagation method to be unstable, and thus the neural network cannot be appropriately trained. In the present embodiment, the eigenvalue decomposition problem is not solved, and thus, it is possible to appropriately train a neural network by using the error back propagation method.

The embodiment of the present disclosure allows for preventing instability in the calculation when the neural network is trained by using the error back propagation method to reduce the estimation error of the beamformer.

Furthermore, it is possible to estimate the beamformer by using the steering vector generated with a high accuracy by the power method, without solving the eigenvalue decomposition problem.

Second Embodiment

Here, as described in Referential non-patent literature 1, an aspect is described in which, instead of the observed signal vector $x_{t,f}$, an intermediate signal vector $\hat{x}_{t,f}$ being a predetermined vector obtained from the observed signal vector $x_{t,f}$ is used to generate the target sound signal $y_{t,f}$. (Referential non-patent literature 1: T. Nakatani, K. Kinoshita, "Maximum-likelihood convolutional beamformer for simultaneous denoising and dereverberation," 2019 27th European Signal Processing Conference (EUSIPCO), 2019.)

A target sound signal generation apparatus 200 generates, from an observed signal vector $x_{t,f}$ corresponding to an observed sound collected by using a plurality of microphones, a target sound signal $y_{t,f}$ corresponding to a target sound included in the observed sound.

Figure 5:
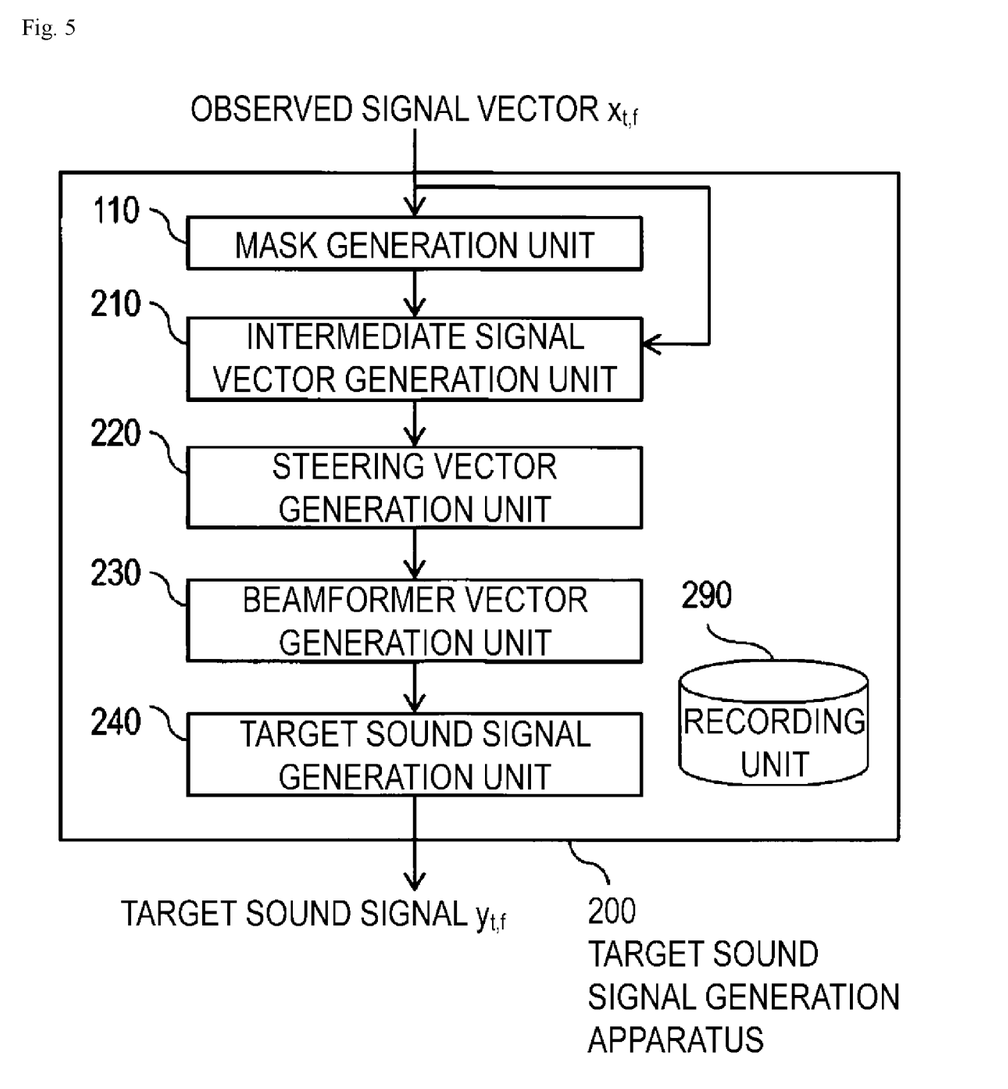
FIG. 5 is a block diagram illustrating a configuration of a target sound signal generation apparatus 200.
Figure 6:
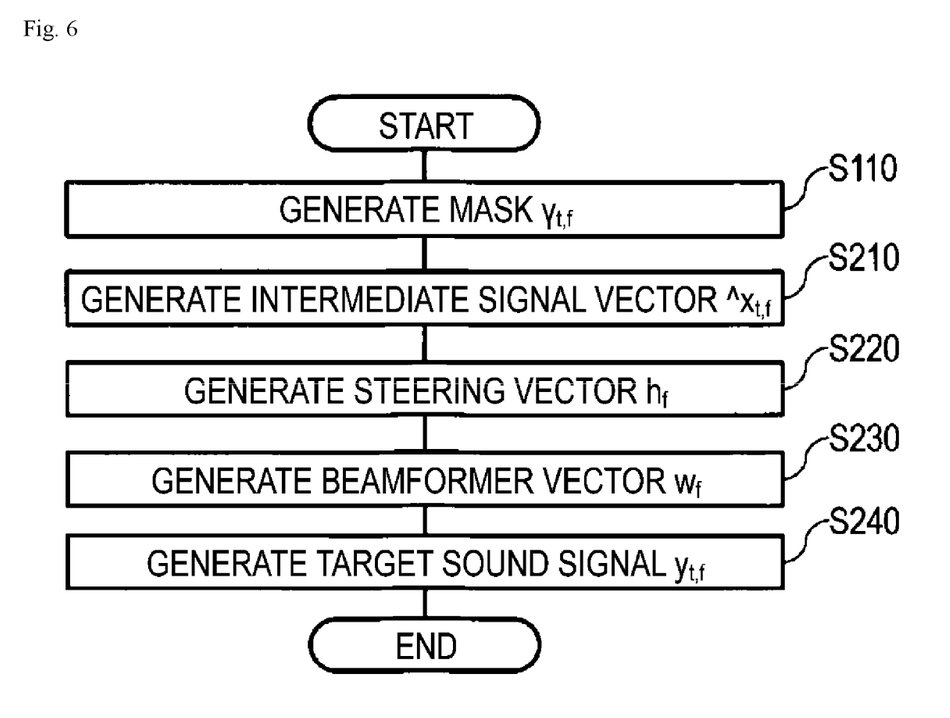
FIG. 6 is a flowchart illustrating an operation of the target sound signal generation apparatus 200.

The target sound signal generation apparatus 200 will be described below with reference to FIGS. 5 and 6. FIG. 5 is a block diagram illustrating a configuration of the target sound signal generation apparatus 200. FIG. 6 is a flowchart illustrating an operation of the target sound signal generation apparatus 200. As illustrated in FIG. 5, the target sound signal generation apparatus 200 includes the mask generation unit 110, an intermediate signal vector generation unit 210, a steering vector generation unit 220, a beamformer vector generation unit 230, a target sound signal generation unit 240, and a recording unit 290. The recording unit 290 is a constituent component configured to appropriately record information required for processing of the target sound signal generation apparatus 200.

The operation of the target sound signal generation apparatus 200 will be described with reference to FIG. 6.

In S110, the mask generation unit 110 receives the observed signal vector $x_{t,f}$ as an input to generate and output a mask $y_{t,f}$ from the observed signal vector $x_{t,f}$.

In S210, the intermediate signal vector generation unit 210 receives the observed signal vector $x_{t,f}$ as an input to generate and output an intermediate signal vector $\hat{x}_{t,f}$ being a predetermined vector obtained by using the observed signal vector $x_{t,f}$. For example, the intermediate signal vector $\hat{x}_{t,f}$ may be a vector including the observed signal vector $x_{t,f}$ and several observed signal vectors having the same frequency bin as the observed signal vector $x_{t,f}$, and a different time frame from that of the observed signal vector $x_{t,f}$ (that is, a vector obtained from a plurality of observed signal vectors including the observed signal vector $x_{t,f}$) (see Referential non-patent literature 1). Furthermore, the intermediate signal vector $\hat{x}_{t,f}$ may be, for example, a vector being obtained by using a weighted prediction error (WPE) method and corresponding to a sound with suppressed reverberation effects included in an observed sound (that is, an output vector according to the WPE method).

In S220, the steering vector generation unit 220 receives the intermediate signal vector $\hat{x}_{t,f}$ generated in S210 and the mask $\gamma_{t,f}$ generated in S110 as an input to generate and output the steering vector $h_f$ from the intermediate signal vector $\hat{x}_{t,f}$ and the mask $\gamma_{t,f}$.

The steering vector generation unit 220 may be configured to generate the steering vector $h_f$ by determining an eigenvector corresponding to a maximum eigenvalue of a predetermined matrix generated from the intermediate signal vector $\hat{x}_{t,f}$ and the mask $\gamma_{t,f}$ by using a power method.

Figure 7:
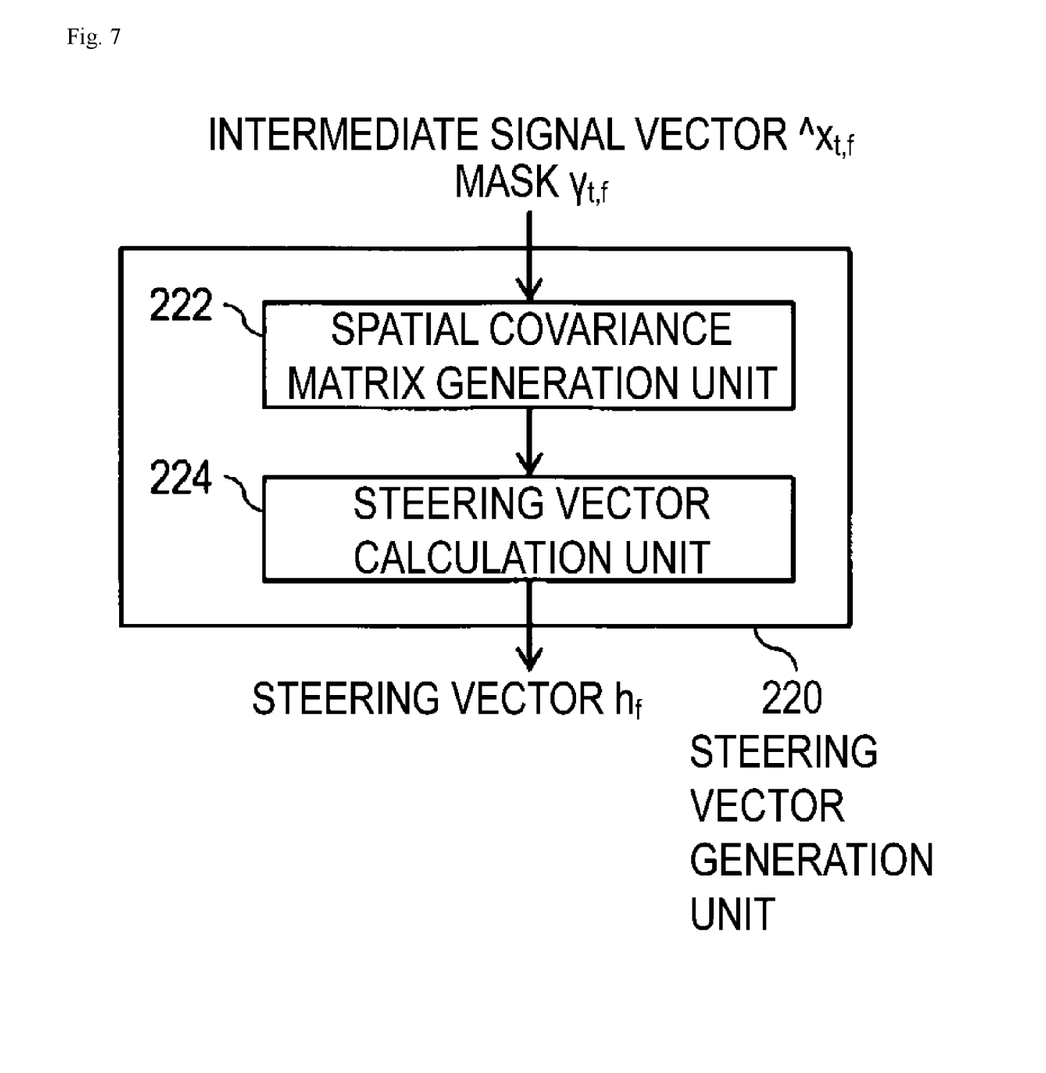
FIG. 7 is a block diagram illustrating a configuration of a steering vector generation unit 220.
Figure 8:
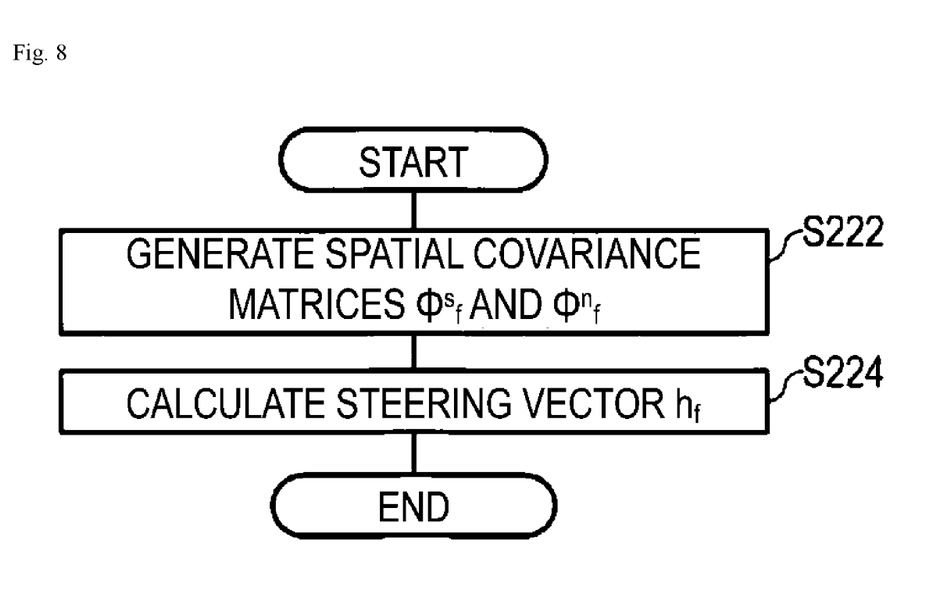
FIG. 8 is a flowchart illustrating an operation of the steering vector generation unit 220.

The steering vector generation unit 220 will be described below with reference to FIGS. 7 and 8. FIG. 7 is a block diagram illustrating a configuration of the steering vector generation unit 220. FIG. 8 is a flowchart illustrating an operation of the steering vector generation unit 220. As illustrated in FIG. 7, the steering vector generation unit 220 includes a spatial covariance matrix generation unit 222 and a steering vector calculation unit 224.

An operation of the steering vector generation unit 220 will be described with reference to FIG. 8.

In S222, the spatial covariance matrix generation unit 222 receives the intermediate signal vector $\hat{x}_{t,f}$ generated in S210 and the mask $\gamma_{t,f}$ generated in S110 as an input to generate and output the target sound spatial covariance matrix $\Phi^s_f$ and the noise spatial covariance matrix $\Phi^n_f$ from the intermediate signal vector $\hat{x}_{t,f}$ and the mask $\gamma_{t,f}$. The spatial covariance matrix generation unit 222 generates the target sound spatial covariance matrix $\Phi^s_f$ and the noise spatial covariance matrix $\Phi^n_f$ according to the following equations.

$$\Phi^s_f = \frac{\sum_t \gamma_{t,f} \hat{x}_{t,f} \hat{x}_{t,f}^H}{\sum_t \gamma_{t,f}} \quad \text{[Math. 9]}$$

$$\Phi^n_f = \frac{\sum_t (1-\gamma_{t,f}) \hat{x}_{t,f} \hat{x}_{t,f}^H}{\sum_t (1-\gamma_{t,f})}$$

In S224, the steering vector calculation unit 224 receives the target sound spatial covariance matrix $\Phi^s_f$ and the noise spatial covariance matrix $\Phi^n_f$ generated in S222 as an input, and uses the target sound spatial covariance matrix $\Phi^s_f$ and the noise spatial covariance matrix $\Phi^n_f$ to calculate and output the steering vector $h_f$ from the initial vector u. The steering vector calculation unit 224 calculates the steering vector $h_f$ according to the following equation $$h_f = \Phi^n_f ((\Phi^n_f)^{-1} \Phi^s_f)^m u \quad \text{[Math. 10]}$$

where m is an integer of 1 or greater representing the number of repetitions. In S230, the beamformer vector generation unit 230 receives the intermediate signal vector $\hat{x}_{t,f}$ generated in S210 and the steering vector $h_f$ generated in S220 as an input to generate and output the beamformer vector $w_f$ from the intermediate signal vector $\hat{x}_{t,f}$ and the steering vector $h_f$. The beamformer vector generation unit 230 generates the beamformer vector $w_f$ according to the following equation $$W_f = \frac{R_f^{-1} h_f}{h_f^H R_f^{-1} h_f} h_{f,r}^* \quad \text{[Math. 11]}$$

where $h_{f,r}$ is an element of the steering vector $h_f$ corresponding to the reference microphone r. Furthermore, a matrix $R_f$ is calculated according to the following equation $$R_f = \sum_t \frac{\hat{x}_{t,f} \hat{x}_{t,f}^H}{\lambda_{t,f}} \quad \text{[Math. 12]}$$

where the sum mentioned above is a sum for the time frame t included in a noise section, and $\lambda_t$ is the power calculated from the observed signal vector $x_{t,f}$.

In S240, the target sound signal generation unit 240 receives the intermediate signal vector $\hat{x}_{t,f}$ generated in S210 and the beamformer vector $w_f$ generated in S230 as an input to generate and output the target sound signal $y_{t,f}$ from the intermediate signal vector $\hat{x}_{t,f}$ and the beamformer vector $w_f$. The target sound signal generation unit 240 generates the target sound signal $y_{t,f}$ according to the following equation.

$$y_{t,f} = w_f^H \hat{x}_{t,f} \quad \text{[Math. 13]}$$

The embodiment of the present disclosure allows for preventing instability in the calculation when the neural network is trained by using the error back propagation method to reduce the estimation error of the beamformer. Furthermore, it is possible to estimate the beamformer by using the steering vector generated with a high accuracy by the power method, without solving the eigenvalue decomposition problem.

Supplement

Figure 9:
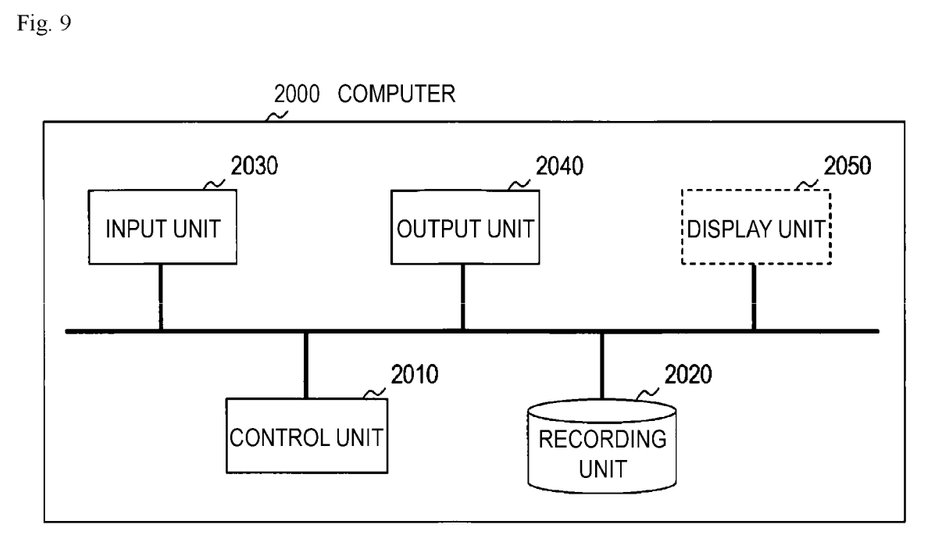
FIG. 9 is a diagram illustrating an example of a functional configuration of a computer implementing each apparatus according to an embodiment of the present disclosure.

FIG. 9 is a diagram illustrating an example of a functional configuration of a computer realizing each of the apparatuses described above. The processing in each of the above-described apparatuses can be performed by causing a recording unit 2020 to read a program for causing a computer to function as each of the above-described apparatuses, and operating the program in a control unit 2010, an input unit 2030, an output unit 2040, and the like.

The apparatus according to the present disclosure includes, for example, as single hardware entities, an input unit to which a keyboard or the like can be connected, an output unit to which a liquid crystal display or the like can be connected, a communication unit to which a communication apparatus (for example, a communication cable) capable of communication with the outside of the hardware entity can be connected, a central processing unit (CPU, which may include a cache memory, a register, and the like), a RAM or a ROM that is a memory, an external storage apparatus that is a hard disk, and a bus connected for data exchange between the input unit, the output unit, the communication unit, the CPU, the RAM, the ROM, and the external storage apparatuses. Furthermore, in the apparatus of the present disclosure, an apparatus (drive) capable of reading and writing from and to a recording medium such as a CD-ROM may be provided in the hardware entity as necessary. An example of a physical entity including such hardware resources is a general-purpose computer.

A program necessary to implement the above-described functions, data necessary for processing of this program, and the like are stored in the external storage apparatus of the hardware entity (for example, the program may be stored not only in the external storage apparatus but in a ROM that is a read-only storage apparatus). For example, data obtained by the processing of the program is appropriately stored in a RAM, the external storage apparatus, or the like.

In the hardware entity, each program and data necessary for the processing of each program stored in the external storage apparatus (or a ROM, for example) are read into a memory as necessary and appropriately interpreted, executed, or processed by a CPU. As a result, the CPU achieves a predetermined function (each of the constituent components expressed as the above-described, unit, means, or the like).

The present disclosure is not limited to the above-described embodiments, and appropriate changes can be made without departing from the spirit of the present disclosure. The processing described in the embodiments is not only executed in the chronological order following the above-described order, but may also be executed in parallel or individually, according to a processing capability of an apparatus executing the processing, or as necessary.

As described above, when a processing function in the hardware entity (the apparatus of the present disclosure) described in the embodiments is implemented by a computer, a processing content of a function that the hardware entity should have is described by a program. By executing this program using a computer, the processing function in the hardware entity is implemented on the computer.

A program in which the processing content is described can be recorded on a computer-readable recording medium. The computer-readable recording medium may be, for example, a magnetic recording apparatus, an optical disc, a magneto-optical recording medium, or a semiconductor memory. Specifically, for example, a hard disk apparatus, a flexible disk, a magnetic tape, or the like can be used as the magnetic recording apparatus, a digital versatile disc (DVD), a DVD-random access memory (RAM), a compact disc read only memory (CD-ROM), a CD-recordable (R)/rewritable (RW), or the like can be used as the optical disc, a magneto-optical disc (MO) or the like can be used as the magneto-optical recording medium, and an electronically erasable and programmable-read only memory (EEP-ROM) or the like can be used as the semiconductor memory.

Furthermore, this program is distributed, for example, by selling, transferring, or renting a portable recording medium such as a DVD or CD-ROM on which the program has been recorded. The program may be stored in a storage apparatus of a server computer and transmitted from the server computer to another computer via a network, so that the program is distributed.

The computer executing such a program first temporarily stores, for example, the program recorded on the portable recording medium or the program transferred from the server computer in a storage apparatus of the computer. When executing the processing, the computer reads the program stored in the storage apparatus of the computer and executes the processing in accordance with the read program. As another execution mode of this program, a computer may directly read a program from a portable recording medium and execute processing according to the program. Furthermore, each time the program is transferred from the server computer to the computer, the computer may sequentially execute processing according to the received program. In addition, the above-described processing may also be executed by a so-called application service provider (ASP) type service in which a processing function is implemented simply by an instruction to execute the program and by acquiring a result without transferring the program from the server computer to the computer. Furthermore, the program having this aspect is assumed to include information that is provided for processing in an electronic calculator and is equivalent to a program (data or the like that has characteristics for defining a processing of a computer rather than being a direct instruction to the computer).

Although in the present aspect, the hardware entity is configured by causing a computer to execute a predetermined program, at least a part of the processing content may be implemented by hardware.

The foregoing description of the embodiments of the present disclosure has been presented for purposes of illustration and description. The foregoing description does not intend to be exhaustive and does not intend to limit the invention to the precise forms disclosed. Modifications and variations are possible from the teachings above. The embodiments have been chosen and expressed in order to provide the best demonstration of the principles of the present invention, and to enable those skilled in the art to utilize the present invention in numerous embodiments and with the addition of various modifications suitable for the actual use considered. All such modifications and variations are within the scope of the present invention defined by the appended claims that are interpreted according to the width provided justly, lawfully, and fairly.

The invention claimed is:

1. A target sound signal generation apparatus, comprising a processor configured to execute a method comprising:
generating a mask $\gamma_{t,f}$ from an observed signal vector $x_{t,f}$ corresponding to an observed sound collected by using a plurality of microphones;
generating a steering vector $h_f$ from the observed signal vector $x_{t,f}$ and the mask $\gamma_{t,f}$;
generating a beamformer vector $w_f$ from the observed signal vector $x_{t,f}$ and the steering vector $h_f$; and
generating a target sound signal $y_{t,f}$ corresponding to a target sound included in the observed sound from the observed signal vector $x_{t,f}$ and the beamformer vector $w_f$,
t being an index representing a time frame and f being an index representing a frequency bin, wherein
the generating the mask $\gamma_{t,f}$ includes a neural network trained by using an error back propagation method, and
the generating the beamformer vector $w_f$ further comprises generating the steering vector $h_f$ by determining an eigenvector corresponding to a maximum eigenvalue of a predetermined matrix generated from the observed signal vector $x_{t,f}$ and the mask $\gamma_{t,f}$ by using a power method.

2. The target sound signal generation apparatus according to claim 1, wherein
the generating the steering vector $h_f$ further comprises:
generating a target sound spatial covariance matrix $\Phi_f^s$ and a noise spatial covariance matrix $\Phi_f^n$ from the observed signal vector $x_{t,f}$ and the mask $y_{t,f}$; and
calculating, by using the target sound spatial covariance matrix $\Phi_f^s$ and the noise spatial covariance matrix $\Phi_f^n$, the steering vector $h_f$ from an initial vector u according to an equation below $$h_f = \Phi_f^n((\Phi_f^n)^{-1}\Phi_f^s)^m u$$

where m is an integer of 1 or greater.

3. The target sound signal generation apparatus according to claim 1,
wherein the determining an eigenvector is based on approximation without performing an eigenvalue decomposition.

4. The target sound signal generation apparatus according to claim 1,
wherein the observed sound corresponds to a sound received by the plurality of microphones.

5. A target sound signal generation method, comprising:
generating, by a target sound signal generation apparatus, a mask $\gamma_{t,f}$ from an observed signal vector $x_{t,f}$ corresponding to an observed sound collected by using a plurality of microphones;
generating, by the target sound signal generation apparatus, a steering vector $h_f$ from the observed signal vector $x_{t,f}$ and the mask $\gamma_{t,f}$;
generating, by the target sound signal generation apparatus, a beamformer vector $w_f$ from the observed signal vector $x_{t,f}$ and the steering vector $h_f$; and
generating, by the target sound signal generation apparatus, a target sound signal $y_{t,f}$ corresponding to a target sound included in the observed sound from the observed signal vector $x_{t,f}$ and the beamformer vector $w_f$,
t being an index representing a time frame and f being an index representing a frequency bin, wherein
the step of generating the mask $\gamma_{t,f}$ is executed by a neural network trained by using an error back propagation method, and
the step of generating the steering vector $h_f$ generates the steering vector $h_f$ by determining an eigenvector corresponding to a maximum eigenvalue of a predetermined matrix generated from the observed signal vector $x_{t,f}$ and the mask $\gamma_{t,f}$ by using a power method.

6. The target sound signal generation method according to claim 5, wherein
the generating the steering vector $h_f$ further comprises:
generating a target sound spatial covariance matrix $\Phi_f^s$ and a noise spatial covariance matrix $\Phi_f^n$ from the observed signal vector $x_{t,f}$ and the mask $y_{t,f}$; and
calculating, by using the target sound spatial covariance matrix $\Phi_f^s$ and the noise spatial covariance matrix $\Phi_f^n$, the steering vector $h_f$ from an initial vector u according to an equation below $$h_f = \Phi_f^n((\Phi_f^n)^{-1}\Phi_f^s)^m u$$

where m is an integer of 1 or greater.

7. The target sound signal generation method according to claim 5, wherein the determining an eigenvector is based on approximation without performing an eigenvalue decomposition.

8. The target sound signal generation method according to claim 5, wherein the observed sound corresponds to a sound received by the plurality of microphones.

9. A target sound signal generation method, comprising:
generating, by a target sound signal generation apparatus, a mask $\gamma_{t,f}$ from an observed signal vector $x_{t,f}$ corresponding to an observed sound collected by using a plurality of microphones;
generating, by the target sound signal generation apparatus, an intermediate signal vector $\hat{x}_{t,f}$ which is a predetermined vector obtained by using the observed signal vector $x_{t,f}$;
generating, by the target sound signal generation apparatus, a steering vector $h_f$ from the intermediate signal vector $\hat{x}_{t,f}$ and the mask $\gamma_{t,f}$;
generating, by the target sound signal generation apparatus, a beamformer vector $w_f$ from the intermediate signal vector $\hat{x}_{t,f}$ and the steering vector $h_f$; and
generating, by the target sound signal generation apparatus, a target sound signal $y_{t,f}$ corresponding to a target sound included in the observed sound from the intermediate signal vector $\hat{x}_{t,f}$ and the beamformer vector $w_f$,
t being an index representing a time frame and f being an index representing a frequency bin, wherein
the step of generating the mask $\gamma_{t,f}$ is executed by a neural network trained by using an error back propagation method, and
the step of generating the steering vector $h_f$ generates the steering vector $h_f$ by determining an eigenvector corresponding to a maximum eigenvalue of a predetermined matrix generated from the observed signal vector $x_{t,f}$ and the mask $\gamma_{t,f}$ by using a power method.

10. The target sound signal generation method according to claim 9, wherein
the generating the steering vector $h_f$ further comprises:
generating a target sound spatial covariance matrix $\Phi_f^s$ and a noise spatial covariance matrix $\Phi_f^n$ from the observed signal vector $x_{t,f}$ and the mask $y_{t,f}$, and
calculating, by using the target sound spatial covariance matrix $\Phi_f^s$ and the noise spatial covariance matrix $\Phi_f^n$, the steering vector $h_f$ from an initial vector u according to an equation below $$h_f = \Phi_f^n((\Phi_f^n)^{-1}\Phi_f^s)^m u$$

where m is an integer of 1 or greater.

11. The target sound signal generation method according to claim 9, wherein the determining an eigenvector is based on approximation without performing an eigenvalue decomposition.

12. The target sound signal generation method according to claim 9, wherein the observed sound corresponds to a sound received by the plurality of microphones.

\* \* \* \* \*